Jan. 31, 1967 C. S. McNULTY 3,301,050
LIQUID FLOW MEASURING APPARATUS
Filed March 16, 1964 3 Sheets-Sheet 1

INVENTOR.
CARRELL S. McNULTY
BY
Brumbaugh, Free, Graves & Donohue
his ATTORNEYS

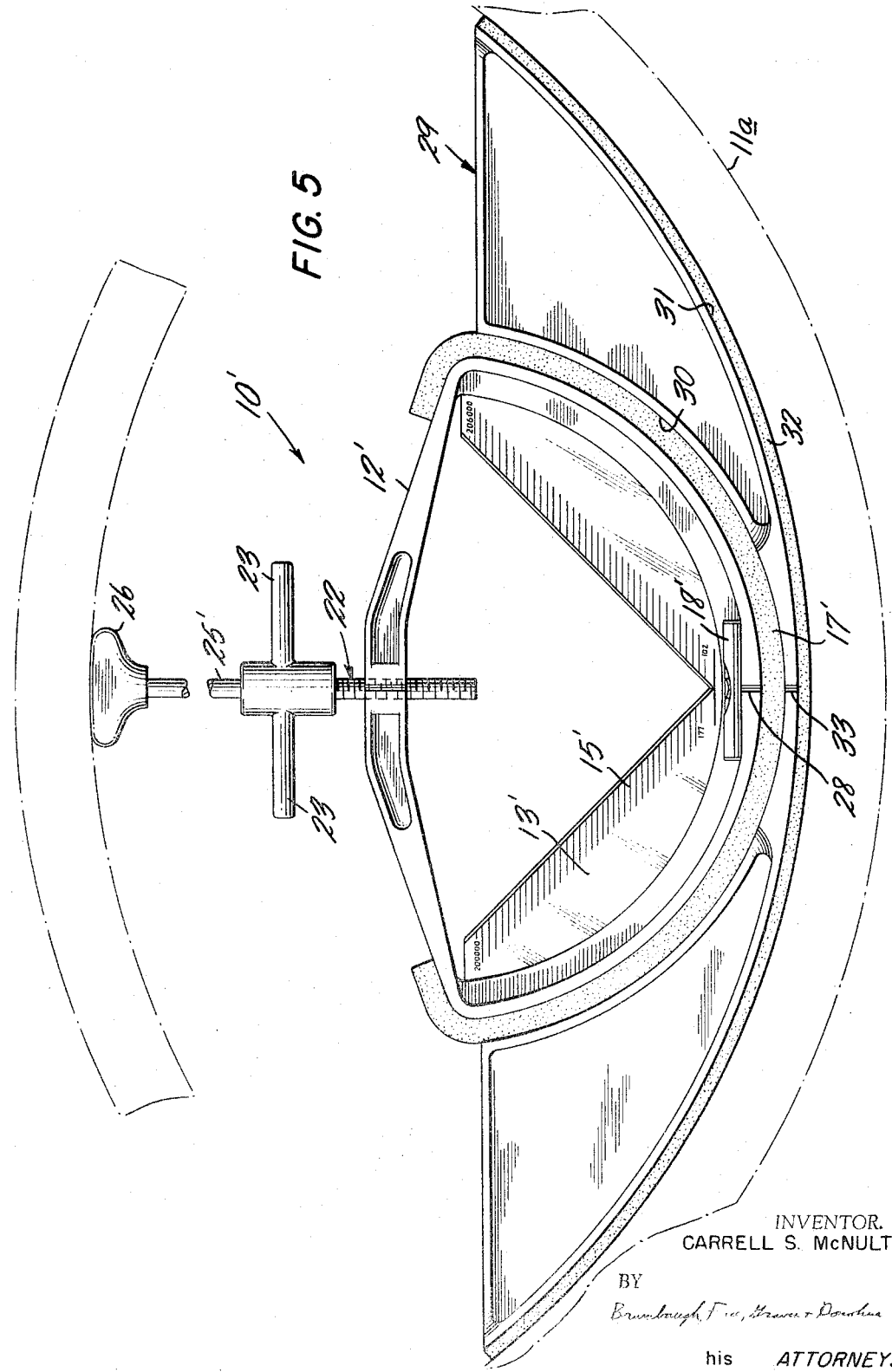

United States Patent Office 3,301,050
Patented Jan. 31, 1967

3,301,050
LIQUID FLOW MEASURING APPARATUS
Carrell S. McNulty, 35 Beulah Road,
New Britain, Pa. 18901
Filed Mar. 16, 1964, Ser. No. 351,989
11 Claims. (Cl. 73—215)

This invention relates to apparatus for measuring the rate of flow of liquid in a conduit and, more particularly, to liquid flow measuring apparatus which is adapted for easy installation in and removal from a conduit through which the liquid flow rate is to be measured.

There are many occasions in the design, construction and maintenance of a pipe system, such as a sewer, in which it is necessary to determine the rate of flow of liquid through the individual pipes or conduits of the system. For instance, during the initial construction the tightness of the system must be checked to determine whether it meets the criteria set forth in the specifications. In some instances the amount of exfiltration must be determined, while in others it is the amount of infiltration which must be checked. It is often desirable to measure periodically the flow rate at key points in the system to determine the effect of weather (chiefly rain) on the flow. Furthermore, the location of leaks in a pipe system is usually best accomplished by comparing the flow rates at selected points in the system. In such pipe systems, the normal flow rate is relatively low, i.e. considerably less than the capacity of the pipe. Moreover, the pipe is sloped at a small angle from the horizontal.

In the past, the liquid flow rate in a conduit has been determined by permanent installation of weir-type devices, however such installations are not only costly and time consuming, but it is often undesirable to have these permanent installations in the system because they constitute partial obstructions in the pipe. As a result, measurements have been made by the use of a measuring cup and a stop watch, or by fashioning a weir out of a sheet of metal or a piece of plywood or the like. Such prior art expedients are time consuming and often very inaccurate.

Accordingly, it is an object of the present invention to overcome the above-mentioned difficulties of conventional techniques for determining the rate of liquid flow in a conduit.

Another object of the invention is to provide a novel apparatus for quickly and accurately determining the rate of flow of liquid in a conduit.

A further object of the invention is to provide a novel apparatus for determining the rate of liquid flow in conduits of different cross-sectional size.

These and other objects and advantages of the invention are attained by providing a weir plate mounted in a frame shaped to fit in substantially liquid-tight relation the interior bottom surface of the conduit in which the rate of liquid flow is to be determined. In one embodiment a wedge-shaped member is slidably mounted on the frame for releasably securing the frame in the conduit. In another embodiment adjustable clamping means are mounted on the frame and adapters are provided, by means of which measurements of liquid flow rates may be made in conduits of different cross-sectional size.

All of the above is more fully explained in the detailed description of the embodiments of the invention which follow, this description being illustrated by the accompanying drawings wherein:

FIG. 5 is a view in front elevation of the apparatus of FIG. 4 together with an adapter secured in a conduit of relatively large cross-sectional size.

Figure 1:
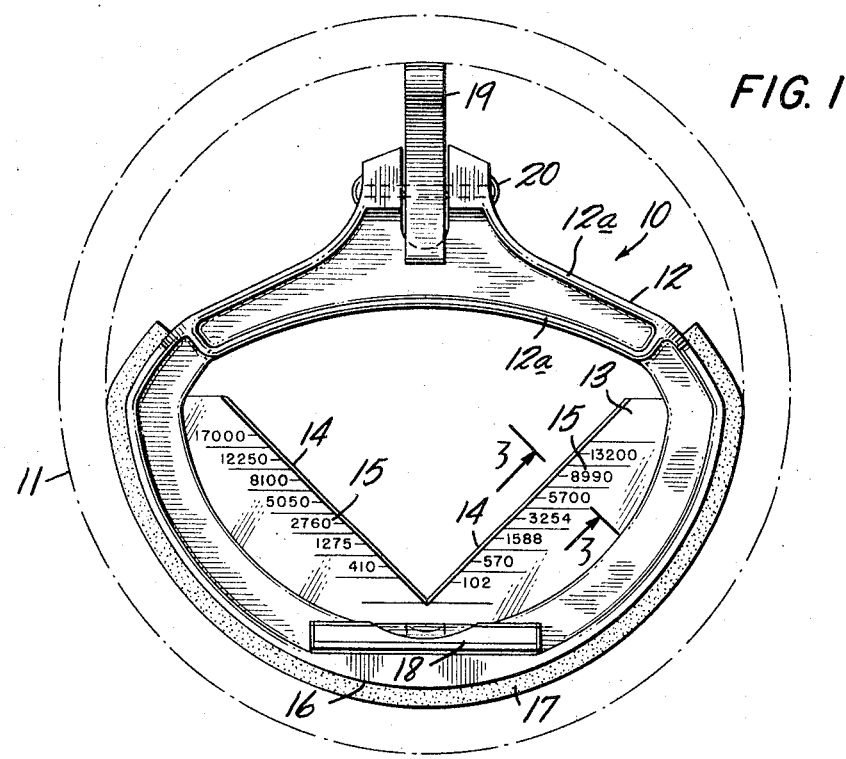
FIG. 1 is a view in front elevation of one embodiment of a typical apparatus for measuring the rate of liquid flow in a conduit (show in phantom) according to the present invention.
Figure 2:
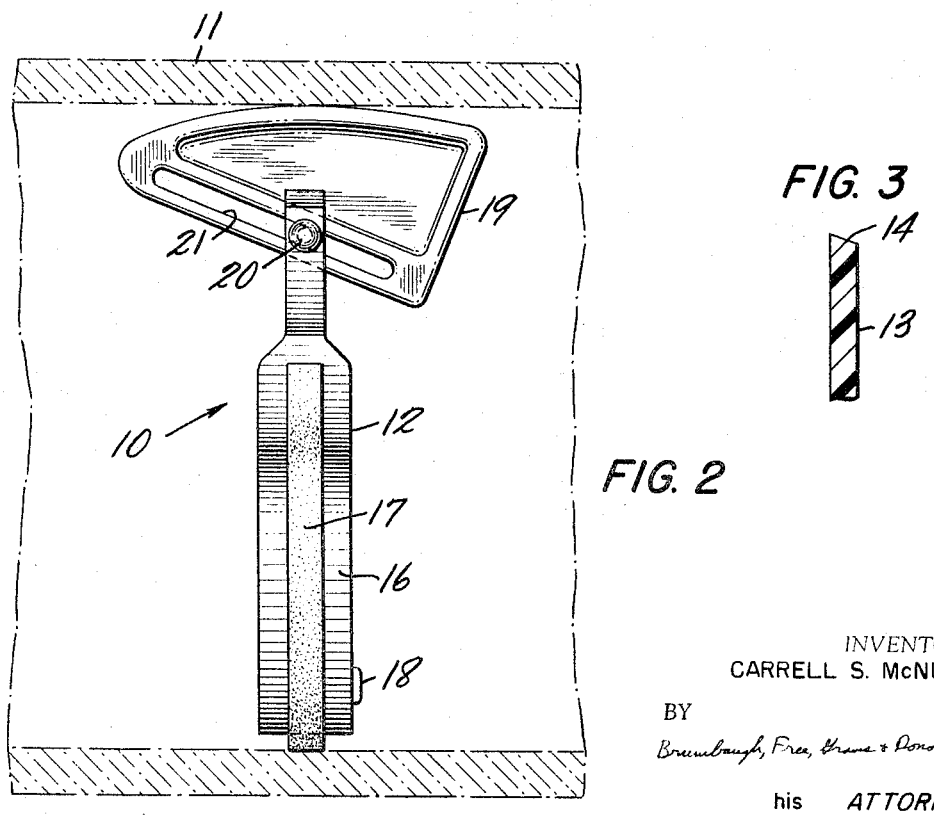
FIG. 2 is a side elevation of the apparatus of FIG 1.
Figure 3:
FIG. 3 is an enlarged fragmentary view in section taken on a plane indicated by the line 3—3 in FIG. 1 and looking in the direction of the arrows showing the edge of the weir plate.

In the representative embodiment of the invention shown by way of example in FIGS. 1 and 2, the liquid flow rate measuring apparatus 10 is disposed in a conduit 11 (shown in phantom). The apparatus 10 includes a frame 12, preferably constructed of a strong but light material such as aluminum. The frame may be reinforced by ribbing 12a as seen in FIG. 1. A weir plate 13 is rigidly mounted by a liquid-tight seal on the frame 12. The weir plate is preferably of a transparent material such as Lucite and is formed with a V-shaped notch at its upper edges 14. A calibration scale 15 is disposed along the edges 14 to indicate directly the rate of liquid flow through the conduit 11, for example the calibrations might be expressed in gallons per 24 hours. For simplicity, some of the individual calibrations are indicated merely by relatively long horizontal lines. The edges 14 are preferably beveled to slope upwardly in the upstream direction, as best seen in FIG. 3.

The bottom edge 16 of the frame 12 is of circular shape (as viewed in FIG. 1), since the conduit 11 is circular in cross section, and extends in an arc of less than 180° so that the apparatus may be easily installed in and removed from the conduit. Of course the frame 12 can be formed to have an edge 16 of any non-circular shape necessary for use in conduits of non-circular cross section. Secured to the edge 16 is a gasket 17, which insures a liquid-tight seal between the frame 12 and the interior bottom surface of the conduit 11 and is preferably of elastomeric material such as sponge rubber. Also mounted on the frame 12 is a level indicating gage 18, which may be of the spirit level variety illustrated.

A wedge-shaped clamping member 19 is slidably mounted on the top portion of the frame 12 by a pin 20, which is secured to the frame 12 and is received in a slot 21 formed in the clamping member.

In order to make a measurement, the apparatus is positioned on the interior bottom surface of the conduit in a vertical position by reference to the level gage 18. Then the apparatus is pressed down to compress the gasket 17 against the conduit, and the wedge 19 is slid as far to the left (as viewed in FIG. 2) as possible so that it snugly engages the upper interior surface of the conduit. If a liquid (not shown) flows through the conduit 11, its surface level upstream of the V-shaped notch corresponds to the rate of flow of liquid over the weir plate 13, as is well known in the art. The liquid flows through the conduit 11 toward the observer as viewed in FIG. 1 and to the right as viewed in FIGS. 2 and 3. By observing the liquid level upstream of the weir plate 13 along the calibration scale 15, one can read the rate of liquid flow through the conduit directly in the units with which the scale 15 is calibrated, for example in gallons per 24 hours. By loosening the wedge 19 (sliding it to the right as viewed in FIG. 2), the apparatus may be quickly removed from the conduit after making a measurement.

The reading obtained is accurate because the V-shaped notch of the weir plate 13 is symmetrical about the vertical as indicated by the level gage 18, and because the compression of the gasket 17 against the conduit due to the position of the wedge 19 insures a liquid-tight seal between the frame 12 and the interior bottom surface of the conduit, i.e. all liquid flows over the V-shaped notch.

Figure 4:
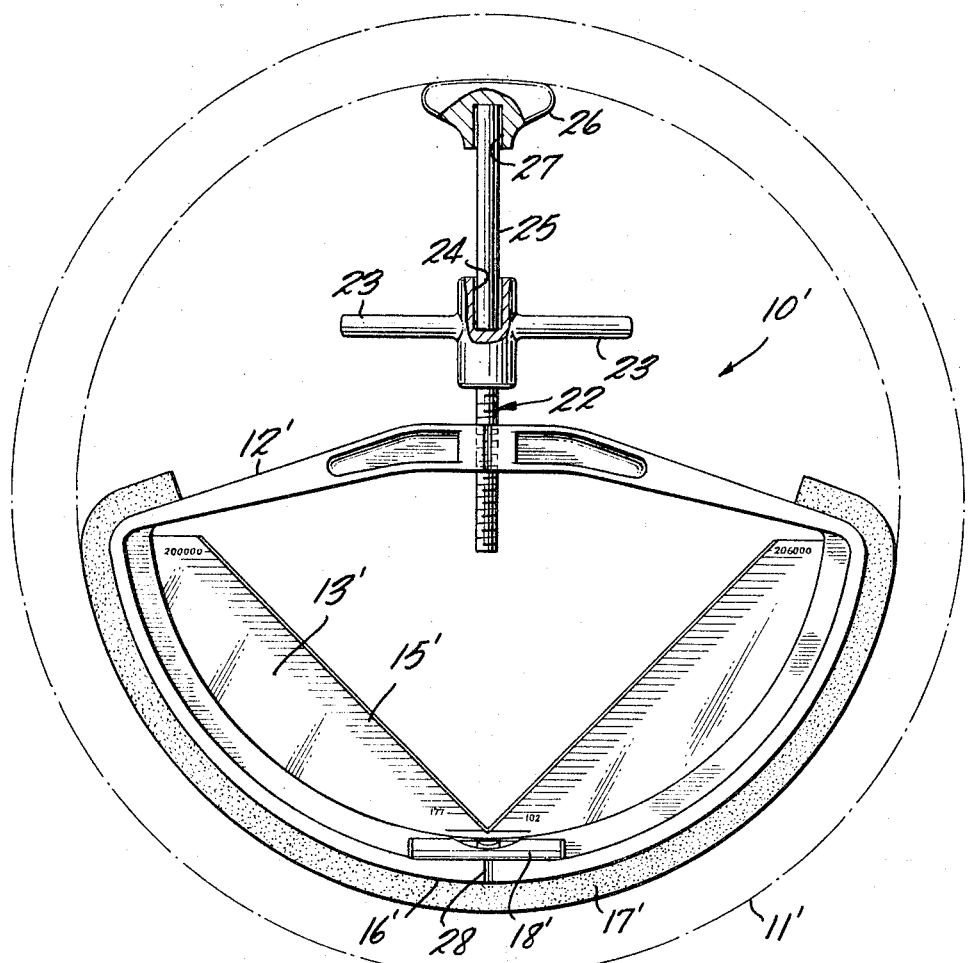
FIG. 4 is a view in front elevation of another embodiment of the apparatus according to the invention showing adjustable clamping means for releasably securing the apparatus in a conduit.

Another embodiment of the invention is illustrated in FIG. 4. Like parts are designated with the same numbers used in the first embodiment, primes being added in FIG. 4. Thus the V-notched weir plate 13' of the apparatus 10' is mounted by a liquid-tight seal on the frame 12', on the bottom edge 16' of which is secured a gasket 17'. A level indicating gage 18' is also mounted on the frame 12'. Threadedly mounted on the top of the frame is a screw clamp 22 having arms 23 by means of which the clamp may be conveniently rotated to raise or lower it with respect to the frame 12'. The clamp 22 is provided with a bore 24 in which one end of an extender rod 25 may be slidably received. A butt member 26 having a bore 27 is slidably mounted on the rod 25. Adjacent the bottom edge 16' of the frame 12' is a scribe line 28, the purpose of which will be explained hereinafter.

To make a measurement with the apparatus 10', it is placed vertically in a conduit 11' with the aid of the level gage 18', after which the screw clamp 22 is rotated to move the butt member 26 against the interior upper surface of the conduit. Further rotation of the clamp will compress the gasket 17' against the interior lower conduit surface whereupon an accurate reading of the liquid flow rate may be taken.

In FIG. 5 the apparatus 10' of FIG. 4 is shown with an adapter 29, by means of which liquid flow measurements may be taken in a conduit 11a of relatively large cross-sectional size with respect to that shown in FIG. 4. The adapter is preferably of a durable light material such as aluminum and may be ribbed as illustrated for greater strength. It is formed with an upper edge 30 shaped to mate with the gasket 17' on the frame 12' and a bottom edge 31 shaped to match the cross-sectional shape of the conduit 11a. Secured to the bottom edge 31 is a gasket 32, which is preferably of elastomeric material. The adapter is provided with a scribe line 33, so that it may be quickly fitted to the frame 12' in the symmetrical relationship illustrated, by insuring that the scribe lines 28 and 33 are colinear. With the adapter 29 and frame 12' so assembled, they are placed in the conduit 11a in the desired vertical position with the aid of the level gage 18', whereupon the screw clamp 22 is rotated to compress both gaskets 17' and 32. An accurate reading may now be taken of the liquid flow rate, since all of the liquid now flows over the V-shaped notch. It should be noted that the extender rod 25' is considerably longer than the rod 25 in FIG. 4 due to the larger diameter of the conduit 11a.

A family of different size adapters 29 and extender rods 25' may be provided with the apparatus 10'. For each adapter there is a corresponding extender rod of the appropriate length, so that the liquid flow rate through conduits of a wide range of cross-sectional size can be quickly and accurately measured by the same basic V-notched weir; only the proper adapter and extender rod need be selected according to the size of the conduit. The adapters and rods may be marked with the diameter of the corresponding conduit for convenience.

While the fundamental novel features of the invention have been shown and described, it will be understood that various substitutions, changes and modifications in the form and details of the apparatus illustrated and its manner of operation may be made by those skilled in the art without departing from the spirit of the invention. All such variations and modifications, therefore, are included within the scope of the invention as defined by the following claims.

I claim:

1. Apparatus for measuring the rate of flow of liquid in a conduit adapted for easy installation inside and removal from said conduit comprising in combination a weir plate adapted to indicate the rate of flow of liquid through said conduit, and a frame for supporting said weir plate, said frame adapted to be removably positioned entirely within said conduit, said weir plate being rigidly mounted on said frame so as to prevent relative motion therebetween, the bottom edge of said frame being shaped to fit in substantially liquid-tight relation the interior bottom surface of said conduit.

2. Apparatus according to claim 1 in which said weir plate is formed with a V-shaped notch, a calibration scale being disposed along said notch to indicate directly the rate of flow of liquid through said conduit when said apparatus is installed therein.

3. Apparatus according to claim 1 including elastomeric sealing means secured to said bottom edge of said frame.

4. Apparatus according to claim 1 including level gage means mounted on said frame for indicating the position of said apparatus in said conduit to insure an accurate indication of the rate of liquid flow through said conduit.

5. Apparatus according to claim 1 including clamping means for releasably securing said frame entirely within said conduit.

6. Apparatus for measuring the rate of flow of liquid in a conduit adapted for easy installation in and removal from said conduit comprising in combination a weir plate adapted to indicate the rate of flow of liquid through said conduit, a frame for supporting said weir plate, the bottom edge of said frame being shaped to fit in substantially liquid-tight relation the interior bottom surface of said conduit, and clamping means for releasably securing said frame in said conduit, said clamping means including wedge means slidably mounted on the top of said frame and adapted to wedge between said frame and the interior surface of said conduit.

7. Apparatus for measuring the rate of flow liquid in a conduit adapted for easy installation in and removal from said conduit comprising in combination a weir plate adapted to indicate the rate of flow of liquid through said conduit, a frame for supporting said weir plate, the bottom edge of said frame being shaped to fit in substantially liquid-tight relation the interior bottom surface of said conduit, and clamping means for releasably securing said frame in said conduit, said clamping means including screw clamp means threadedly mounted on the top of said frame and adapted to engage the interior surface of said conduit.

8. Apparatus according to claim 7 in which said screw clamp means includes one of a plurality of extender rods of different length.

9. Apparatus for measuring the rate of flow of liquid in a conduit adapted for easy installation in and removal from said conduit comprising in combination a weir plate adapted to indicate the rate of flow of liquid through said conduit, a frame for supporting said weir plate, the bottom edge of said frame being shaped to fit in substantially liquid-tight relation the interior bottom surface of said conduit, clamping means for releasably securing said frame in said conduit, and one of a plurality of different size adapters, said adapters being shaped to fit in substantially liquid-tight relation the bottom edge of said frame and the interior bottom surface of a plurality of conduits of different cross-sectional size.

10. Apparatus according to claim 1 in which said bottom edge of said frame extends in an arc of less than 180°.

11. Apparatus for measuring the rate of flow of liquid in a conduit adapted for easy installation in and removal from said conduit comprising in combination a weir plate adapted to indicate the rate of flow of liquid through said conduit, said weir plate being formed with a V-shaped notch, a calibration scale being disposed along said notch to indicate directly the rate of flow of liquid through said conduit when said apparatus is installed therein, a frame for supporting said weir plate, the bottom edge of said frame being shaped to fit in substantially liquid-tight relation the interior bottom surface of said conduit, said bottom edge of said frame extending in an arc of less than 180°, elastomeric sealing means secured to said bottom edge of said frame, level indicating means mounted on said frame for insuring an accurate indication of the rate of liquid flow through said conduit, and clamping means for releasably securing said frame in said conduit.

References Cited by the Examiner

UNITED STATES PATENTS

| | | | |
|---|---|---|---|
| 2,352,157 | 6/1944 | Bennett | 73—215 |
| 2,817,309 | 12/1957 | Wittlin | 73—194 X |
| 3,087,335 | 4/1963 | Cavenah | 73—215 |

RICHARD C. QUEISSER, *Primary Examiner.*

EDWARD D. GILHOOLY, *Assistant Examiner.*